J. REECE.
SEAT COVER.
APPLICATION FILED MAR. 14, 1921.
1,436,459.
Patented Nov. 21, 1922.
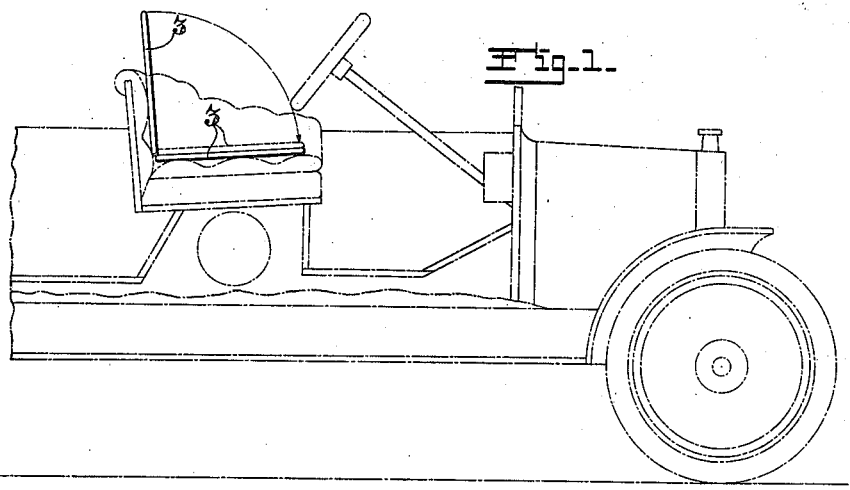
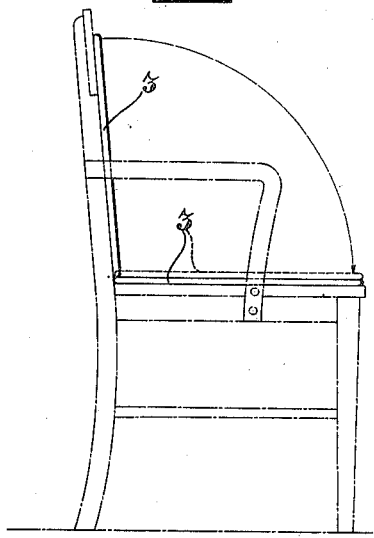
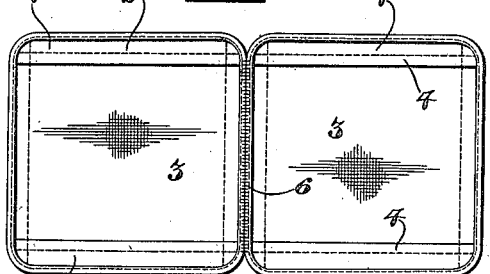
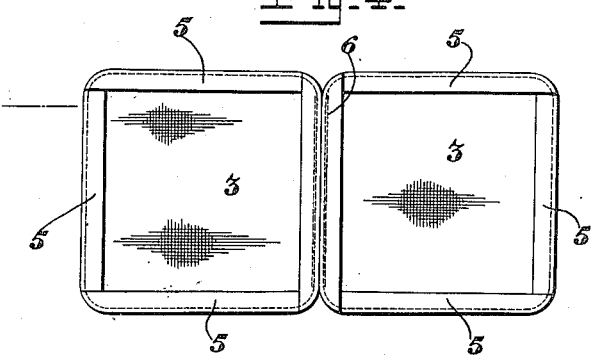
Inventor.
John Reece,
by Pippey & Kingsland
His Attorneys.

Patented Nov. 21, 1922.

1,436,459

UNITED STATES PATENT OFFICE.

JOHN REECE, OF ST. LOUIS, MISSOURI, ASSIGNOR TO EVR KLEAN SEAT PAD CO., OF ST. LOUIS, MISSOURI, A CORPORATION OF MISSOURI.

SEAT COVER.

Application filed March 14, 1921. Serial No. 452,107.

*To all whom it may concern:*

Be it known that I, JOHN REECE, a citizen of the United States, residing at St. Louis, Missouri, have invented a new and useful Seat Cover, of which the following is a specification.

This invention relates to improvements in seat covers, and consists in novel construction hereinafter disclosed.

An object of the invention is to provide a removable seat cover that may be placed in automobile seats, chair seats and the like, to protect the clothes of the user and to form a comfortable support.

Another object of the invention is to provide a seat cover comprising a seat member and a back member secured together and arranged to extend over the seat and back portion of a permanent seat, such as the seat of an automobile or of a chair, and which may be folded together when not in use to protect it against the accumulation of dust thereon.

Another object of the invention is to provide a seat cover that may be conveniently mounted in a permanent seat, having a seat member and a back member arranged to fold and extend along the line of their juncture, the said seat cover being composed of sufficiently stiff material so that when the back member thereof is extended it will retain its position to cover the back of the seat.

With the foregoing, as well as additional advantages in view, I have constructed a seat cover as hereinafter described, reference being made to the accompanying drawing, in which, Fig. 1 is a side view, showing the seat cover applied to an automobile seat, the seat cover being extended.

Fig. 2 illustrates the seat cover in position on a chair.

Fig. 3 is a top plan view of the seat cover in extended position.

Fig. 4 is a bottom plan view of the same.

As illustrated in the drawing, the seat cover comprises two members preferably of duplicate construction, the one constituting the seat member of the cover and the other the back member. In the drawing the seat member of the seat cover is indicated by 1 and the back member is indicated by 2. Each of the members 1 and 2, comprises a suitably formed body 3 of some relatively stiff material which is sufficiently porous to make the seat cover cool when in use, so that when the back member is raised it will have sufficient inherent stiffness to remain upright and in place against the back of the permanent seat. For this purpose, it is preferred that such material as fibre matting be used for the body of each of the members 1 and 2.

In order to reinforce the members 1 and 2 and to make them strong and durable, there is sewed to each side of the body 3 a marginal strip 4. The reinforcing side members 4 are preferably formed from relatively strong material such as leather, or imitation leather, which materials possess the desired characteristics of flexibility and pliability. In order to further reinforce the body portion of the members 1 and 2, a marginal strip 5 is secured to the back face of each of the members 1 and 2, said marginal strips 5 extending all the way around each of the members 1 and 2, and being overturned at the edges so as to give strength to the body portions of the members 1 and 2 and to keep the edges thereof from fraying.

The members 1 and 2 are sewed together at 6, in such a manner that the two members may be folded together or extended, as illustrated in Figs. 1 and 2 of the drawing.

When the seat cover is in use, it is mounted in the permanent seat in the manner illustrated in Figs. 1 and 2 of the drawing; that is to say, when the seat portion of the seat cover is placed on the permanent seat the back member is raised to a substantially vertical position, in which position it will be held by its inherent stiffness.

When the seat cover is not in use it may be folded down, as indicated by the arrows in Figs. 1 and 2, so that the portion of the seat cover that comes in contact with the clothes of the user will be kept from dust or accumulation of dirt thereon.

A seat cover constructed in accordance with the present invention may be readily mounted on the permanent seat, and is of such a structure that it will be held in proper place without the aid of any fastening devices. It will be noted, also, that a seat cover constructed in accordance with the present invention may be very cheaply made, and that it will be durable in use.

It is thus seen that the invention fully accomplishes the objects above set out, and it will be understood that certain modifications may be made therein without departing from the spirit and scope of the invention.

I do not limit myself, therefore, to the exact construction shown and described; but what I claim and desire to secure by Letters Patent, is:—

1. As an article of manufacture, a removable and interchangeable portable seat cover, comprising a seat member and a back member pivotally united along adjacent edges and arranged to fold flat one against the other, the back member including a body portion of porous material of sufficient stiffness to remain extended vertically and of sufficient flexibility to permit bending to adjust itself to the curvature of the back of a seat to which it may be applied, and reinforcements of flexible and pliable material secured to the marginal edges of both of said members.

2. As an article of manufacture, a removable and foldable seat cover, comprising a seat member and a back member pivotally sewed together at adjacent edges, whereby the back member may be folded flat upon the seat member throughout its width, each of said members being composed of a body of matting of sufficient stiffness to hold the back member extended upwardly and of sufficient flexibility to permit both members to bend to the contour of the seat and the back of a supporting seat to which they may be applied, and strips of flexible and pliable material secured to the edges of each of said members.

3. In a device of the character described, a seat member comprising a body composed of straw matting, a relatively wide strip of flexible material at each side edge of the body and sewed to the body near their inner edges at a considerable distance from the side edges of the body to obtain connection with the body of sufficient strength to prevent separation of the strips from the body, a marginal strip extending entirely around the edge of the body and folded to enclose the edge of the body entirely around the same and to enclose the outer edges of said first-named strips, and stitching passing through folded portions of said marginal strip and through said first-named strips and through the body.

4. In a device of the character described, a seat member comprising a body composed of straw matting, a marginal strip of flexible substantially non-elastic fabric extending entirely around the edge of the body and folded to enclose the edge of the body entirely around the same, and stitching passing through said strip and through the body and securing the strip to the body and leaving the body free to bend to the curvature of the seat in any direction.

5. A seat cover comprising a seat member, a binding strip embracing and secured to the margins of said seat member, a back member, a binding strip embracing and secured to the margins of said back member, and means whereby said binding strips are connected to form a hinge uniting said seat and back member.

6. A seat cover comprising a seat member, a binding strip embracing and secured to the margins of said seat member, a back member, a binding strip embracing and secured to the margins of said back member, and stitches whereby said binding strips are connected together so as to form a hinge uniting said seat and back members.

7. A seat cover comprising a seat member made of woven fabric, a flexible binding strip surrounding and embracing the margins of said seat member, stitches securing said binding strip to said seat member, a back member made of woven fabric, a flexible binding strip surrounding and embracing the margins of said back member, stitches securing the last mentioned binding strip to said back member, and means whereby said flexible binding strips are connected to form a hinge uniting said seat and back members.

8. A seat cover comprising a seat member made of woven straw matting, a flexible binding strip surrounding and embracing the margins of said seat member so as to enclose the edges of said straw matting, stitches passing through said binding strip and seat member, a back member made of woven straw matting, a flexible binding strip surrounding and embracing the margins of said back member, stitches passing through the last mentioned binding strip and back member, one of the edges of said seat member being adjacent to an edge of said back member, and stitches passing through the binding strips at said adjacent edges to form a hinge uniting said seat and back members.

JOHN REECE.